(No Model.)

J. H. & P. LUX.
HAY ELEVATOR AND CARRIER.

No. 291,368. Patented Jan. 1, 1884.

WITNESSES:
Fred. G. Dieterich
J. Fred. Reily

John H. Lux,
Philip Lux,
INVENTORS.

By Louis Bagger & Co.,
ATTORNEYS.

UNITED STATES PATENT OFFICE.

JOHN H. LUX AND PHILIP LUX, OF EARLVILLE, IOWA.

HAY ELEVATOR AND CARRIER.

SPECIFICATION forming part of Letters Patent No. 291,868, dated January 1, 1884.

Application filed November 5, 1883. (No model.)

*To all whom it may concern:*

Be it known that we, JOHN H. LUX and PHILIP LUX, citizens of the United States, and residents of Earlville, in the county of Delaware and State of Iowa, have invented certain new and useful Improvements in Hay Elevators and Carriers; and we do hereby declare that the following is a full, clear, and exact description of the invention, which will enable others skilled in the art to which it appertains to make and use the same, reference being had to the accompanying drawings, which form a part of this specification, and in which—

Figure 1:
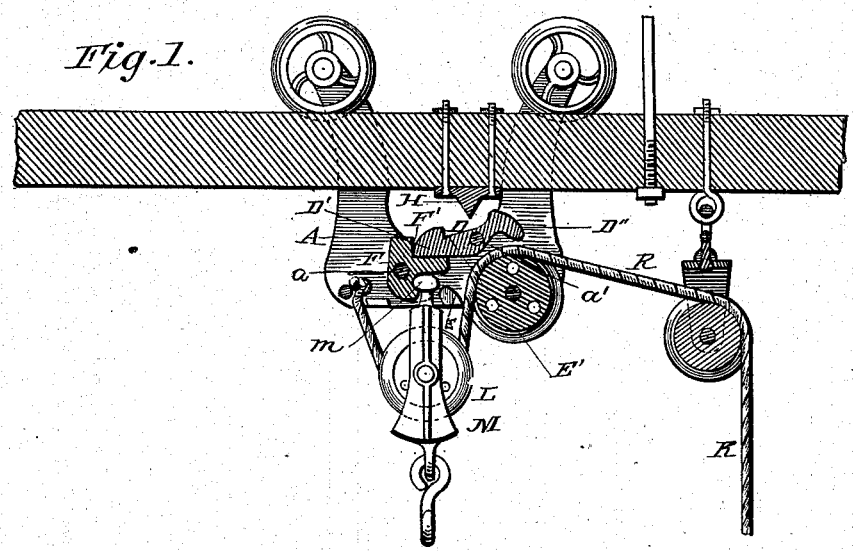
Figure 2:
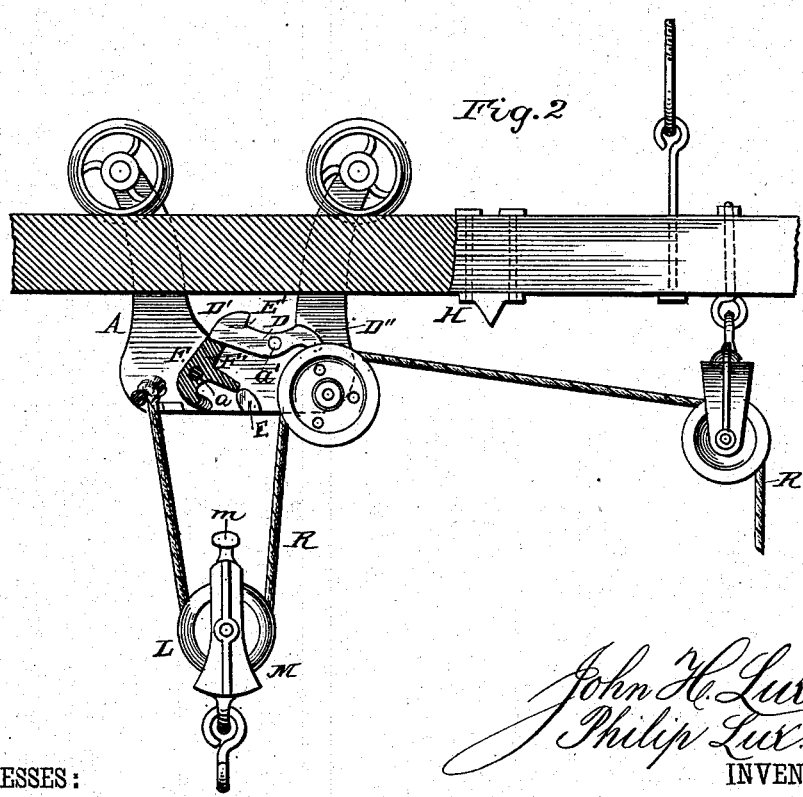

Figure 1 is a sectional side elevation of our improved hay elevator and carrier, showing the interior construction and arrangement of parts of the carriage after the fork-sheave has reached and interlocked with it, and is ready to start off on the track; and Fig. 2 is a similar view, showing the carriage in its position after it has passed the triangular latch-block H, and is in position to receive and interlock with the fork-sheave suspended below the carriage.

Similar letters of reference indicate corresponding parts in both the figures.

Our invention consists in certain new and useful improvements upon the hay elevator and carrier for which Letters Patent No. 260,697 were granted to us, bearing date of July 4, 1882, as will be hereinafter more fully described and claimed.

In the accompanying drawings, the track-beam, carriage proper, and hoisting-pulley or fork-pulley are precisely the same as those described and shown in the above-mentioned Letters Patent, and do not therefore require any description.

F represents the cup or bell shaped catch, which has its fulcrum upon one of the bolts $a$, which connect the sides A A', and which is of the shape shown in the drawings, having a shoulder or step, F', upon its upper side, with which one end of the lever D engages in order to lock the sheave-frame M in its raised position. Above this catch is pivoted, at $a'$, the lever D, the long arm D' of which extends partially over the catch F, and is provided near its extremity with a step or shoulder, E', for the purpose hereinafter described. The shape of this lever is clearly shown in the drawings, both of its arms being beveled or partially rounded upon the upper side of their extremities.

The operation of this improved locking device is as follows: This locking device particularly adapts the carrier to be used for loading hay out of the mow onto the wagon, as well as for unloading from the wagon onto the mow or stack. This is done by placing a latch-block on the track over the mow, and another on the track over the wagon. As the carriage travels along the track-beam to receive a load from the wagon, block H will, as it passes under it, strike the lip or short lever-arm D'', and thus tilt the long arm D' in an upward direction, which releases catch F from the extremity of the said long arm, thus releasing ball $m$, which is clamped between the socketed catch F and studs E, when the hoisting-pulley L will drop down upon the load by its own weight and that of the fork. After the fork has been charged, it is elevated by pulling on rope R until ball $m$, entering the bell-shaped mouth B in the bottom of the carriage, strikes and tilts catch F, the socket of which it enters, and is held therein between it and the studs E by lever D falling back into its locking position; but before ball $m$ reaches its socket, and while the load is being elevated from the wagon to the carrier, the latter is held in place upon the track-beam by the block H abutting against the abrupt side of step or shoulder F', which it cannot pass until ball $m$, entering the socketed catch F, throws this and lever-arm D' up sufficiently to dip arm D'', so that the carriage may pass under block H on its return trip to the mow. When the carriage reaches that part of the track which is above the mow, the beveled or rounded end of the short arm D'' strikes against the other block H, which is secured upon the under side of the track just above the mow, thereby opening the locking device in the manner just described, and allowing the hoisting-pulley L and fork to fall down upon the mow by their own weight.

It is obvious that the carrier can also be used to load hay from the mow upon the wagon, in a similar manner, if desired.

From the foregoing description, taken in connection with the accompanying drawings, the construction of our invention, as well as its manner of operating, will readily be understood without requiring further explanation.

It will be seen that the carrier can be easily and readily changed to work from opposite ends of the track by simply removing it from the end of the track and reversing it.

Having thus described our invention, we claim and desire to secure by Letters Patent of the United States—

The improved locking device for hay elevators and carriers of the described class herein shown and described, consisting of the pivoted catch F, having shoulder F', and the pivoted lever D, having long arm D', provided with a step or shoulder, E', and having the upper side of its extremity beveled or partially rounded, and short arm D'', having the upper side of its extremity beveled or rounded, as and for the purpose shown and set forth.

In testimony that we claim the foregoing as our own we have hereunto affixed our signatures in presence of two witnesses.

JOHN H. LUX.
PHILIP LUX.

Witnesses:
J. W. DIETRICK,
ALEX. SAFSTROM.